United States Patent
Odajima et al.

(10) Patent No.: US 7,441,686 B2
(45) Date of Patent: Oct. 28, 2008

(54) FRICTION STIR WELDING APPARATUS

(75) Inventors: Masaru Odajima, Hiki-gun (JP); Hideo Nakamura, Sakado (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/543,627

(22) Filed: Oct. 5, 2006

(65) Prior Publication Data

US 2007/0023484 A1   Feb. 1, 2007

Related U.S. Application Data

(62) Division of application No. 10/758,071, filed on Jan. 14, 2004, now Pat. No. 7,137,545.

(30) Foreign Application Priority Data

Jan. 14, 2003  (JP) .............................. 2003-006141

(51) Int. Cl.
 *B23K 20/12* (2006.01)
(52) U.S. Cl. ..................... 228/2.1; 228/112.1
(58) Field of Classification Search .............. 228/112.1, 228/2.1

See application file for complete search history.

(56) References Cited

U.S. PATENT DOCUMENTS

| 4,348,041 | A   | * | 9/1982 | Imai et al. ................. 285/288.2 |
| 6,070,784 | A   |   | 6/2000 | Holt et al. |
| 6,247,634 | B1  |   | 6/2001 | Whitehouse |
| 6,257,479 | B1  | * | 7/2001 | Litwinski et al. .......... 228/112.1 |
| 6,484,924 | B1  | * | 11/2002 | Forrest .................... 228/112.1 |
| 6,703,093 | B2  | * | 3/2004 | Foster ....................... 428/36.9 |
| 7,150,389 | B1  | * | 12/2006 | Knipstrom et al. ....... 228/112.1 |
| 2001/0015369 | A1 |   | 8/2001 | Litwinski et al. |
| 2002/0027153 | A1 |   | 3/2002 | Sayama et al. |

FOREIGN PATENT DOCUMENTS

| EP | 0803314 A2 | 10/1997 |
| JP | 10-137859 | 5/1998 |
| JP | 10-193139 | 7/1998 |
| JP | 10-230373 | 9/1998 |
| JP | 11-226759 | 8/1999 |
| JP | 2000-153377 | 6/2000 |
| JP | 2000-334576 | 12/2000 |
| JP | 2001-191183 | 7/2001 |
| JP | 2001-237621 | 8/2001 |
| JP | 2002-66763 | 3/2002 |
| JP | 2002-188513 | 7/2002 |
| JP | 2004-042049 | 2/2004 |

\* cited by examiner

*Primary Examiner*—Kevin P Kerns
*Assistant Examiner*—Michael Aboagye
(74) *Attorney, Agent, or Firm*—Lahive & Cockfield, LLP; Anthony A. Laurentano, Esq.

(57) ABSTRACT

A body member and flange members are butted together at first and second abutment portions, and are retained by first and second backing jigs. In this arrangement, inner circumferential surfaces of the first and second abutment portions are fitted on and in close contact with outer circumferential surfaces of the first and second backing jigs. Subsequently, the friction stir welding is performed along each of the first abutment portion and the second abutment portion by using a probe which is rotated at a high speed.

4 Claims, 9 Drawing Sheets

FRICTION STIR WELDING APPARATUS

RELATED APPLICATIONS

This application is a divisional application Ser. No. 10/758,071, filed Jan. 14, 2004, now U.S. Pat. No. 7,137,545 which claims priority to Japanese Patent Application No. 2003-006141 filed Jan. 14, 2003. The contents of the aforementioned applications are hereby incorporated by reference.

BACKGROUND OF THE INVENTION

1. Field of the Invention

The present invention relates to a method of and an apparatus for friction stir welding for joining an abutment portion by moving a rotating probe relatively along the abutment portion while pressing the probe against one surface of the abutment portion at which an end of a first cylindrical member and an end of a second cylindrical member are butted together.

2. Description of the Related Art

The friction stir welding (hereinafter referred to as "FSW" as well) is generally known, in which two workpieces are joined in solid phase by utilizing the frictional heat which is generated when a rotating probe is inserted into the workpieces (objects). When the joining is performed as described above, the joined portion of the workpiece can maintain a strength which is about 80% of that of the base material, and it is also possible to prevent crystals from becoming coarse.

If the welding is performed by means of the conventional spot welding or the conventional electron beam welding by using an aluminum material as the workpiece, for example, some excessive heat is applied to the aluminum material. Therefore, the strength may be decreased due to deterioration of the material and/or change into coarse microstructure.

In contrast, the joining by FSW is performed at about 500° C. even when a metal material such as the aluminum material having a relatively low melting point (about 600° to 660° C. in the case of the aluminum material) is used. Therefore, it is possible to perform FSW by using other materials such as magnesium, titanium, and polymer as well as the aluminum material.

As an example of the application of FSW to the aluminum material, an aluminum frame of a large member such as an electric train may be exemplified. In the case of such a large member, the thickness of the aluminum material is usually not less than 5 mm considering the strength of the joining. On the other hand, if light weight is desired as well as the improvement of strength in the case of gas turbine engines or the like, it is difficult to increase the thickness of each component. For this reason, for example, a thin plate aluminum material of about 1.2 mm thickness is used to prepare an outer frame of the gas turbine engine.

However, when an abutment portion, at which both ends of thin plate-shaped aluminum materials are butted together, is joined by means of FSW to form a cylindrical member having a relatively large diameter, it is impossible to obtain a satisfactory circularity or roundness because the aluminum material is thin.

Further, when an abutment portion, at which ends of two cylindrical members are butted together, is joined by FSW, the circumferential lengths of the respective ends may not be the same. Therefore, if the cylindrical members are joined in this state by FSW, the difference in phase appears at the final position of the joint, and for example, the shape is deformed in a wavy form, resulting in wrinkles or corrugations.

Additionally, the pressing force of 1 t to 2 t is applied to the thin plate-shaped aluminum material during the joining by FSW. Therefore, some irregularity may appear at the joined portion as a result of FSW, if the aluminum material is not retained reliably.

Japanese Laid-Open Patent Publication No. 11-226759 describes a method of joining aluminum members as shown in FIG. 9, for example. A backing member 3 of the same material as that of hollow tubes 1a, 1b, is arranged at the inside of an abutment portion 2 of the hollow tubes 1a, 1b made of aluminum. A predetermined interstice or clearance C is formed between the backing member 3 and the inner surface of the abutment portion 2.

In this arrangement, a probe tip 4a of a probe 4 is inserted into the abutment portion 2 and the backing member 3 while the probe 4 is rotated at a high speed, and the probe 4 is moved along the abutment portion 2. Accordingly, the entire circumference of the circumscribing abutment portion 2 is welded by the friction stir welding.

In the case of Japanese Laid-Open Patent Publication No. 11-226759, the backing member 3 is provided as a reinforcing member of the hollow tubes 1a, 1b, and the reinforcing member is joined to the inner surfaces of the hollow tubes 1a, 1b. However, the hollow tubes 1a, 1b, to which the backing member 3 is joined as described above, cannot be used as an outer frame of a gas turbine engine, for example. Further, the interstice C is provided between the backing member 3 and the inner surfaces of the hollow tubes 1a, 1b. Therefore, it is impossible to maintain the circularity of the abutment portion 2 especially when the hollow tubes 1a, 1b are thin and each of them has a cylindrical shape with a large diameter.

SUMMARY OF THE INVENTION

A principal object of the present invention is to provide a method of and an apparatus for friction stir welding in which first and second cylindrical members, which are especially thin and large in diameter, can be joined in a well-suited manner while maintaining the circularity of them, and also it is possible to simplify the arrangement and the steps.

According to the present invention, a backing jig is externally fitted on first and second cylindrical members. Ends of the first and second cylindrical members are butted together at an abutment portion. The abutment portion has one surface (outer circumferential surface) and another surface (inner circumferential surface) which is fitted on and in close contact with an outer circumferential surface of the backing jig.

In this state, a rotating probe is moved relatively along the abutment portion while pressing the probe against the one surface of the abutment portion. Accordingly, the entire circumference of the abutment portion is joined. In this situation, the abutment portion is in close contact with the outer circumferential surface of the backing jig. Therefore, even when the abutment portion is thin and has a large diameter, it is possible to maintain the abutment portion to have a desired shape. Therefore, the friction stir welding operation is efficiently performed for the abutment portion in accordance with the simple and economical arrangement and steps.

Subsequently, the backing jig is separated from the other surface of the abutment portion after performing the friction stir welding for the entire circumference of the abutment portion. Accordingly, it is possible to obtain the thin abutment portion by the friction stir welding. Further, it is possible to avoid occurrence of the residual stress in the abutment portion.

The first and second cylindrical members are externally fitted on the backing jig while the first and second cylindrical members are relatively expanded as compared with the backing jig. For example, when the first and second cylindrical members are heated, the first and second cylindrical members are thermally expanded, and the inner circumferential diameters are increased. Therefore, the first and second cylindrical members are externally fitted on the backing jig with ease. Further, the first and second cylindrical members are shrunk when cooled, and reliably in close contact with the outer circumferential surface of the backing jig.

In this configuration, the outer circumferential surface of the backing jig has a completely circular shape. The ends of the first and second cylindrical members, which are in close contact with the outer circumferential surface, have an identical circumferential length. Therefore, even when the abutment portion is especially thin with a relatively large diameter, no difference in phase arises, which would be otherwise caused, for example, by deformation and wrinkles when the probe is inserted. Thus, it is possible to maintain the circularity of the abutment portion suitably, and the dimensional accuracy is improved. Further, it is possible to effect correct positioning by avoiding deviation of the abutment portion, and the friction stir welding is carried out efficiently.

The backing jig can be separated from the first and second cylindrical members easily and reliably, because the first and second cylindrical members are relatively expanded as compared with the backing jig.

The first and second cylindrical members are welded by the friction stir welding along the abutment portion while a pressing force is applied in a direction substantially perpendicular to a direction of insertion of the probe. Therefore, it is possible to reliably join the ends of the first and second cylindrical members under the pressure, and it is possible to highly accurately join the abutment portion.

A clamp jig is arranged on the one surface of the abutment portion and prevents the abutment portion from being deformed during the friction stir welding. Accordingly, the position of the abutment portion is not deviated when the abutment portion is expanded during the friction stir welding. Thus, the joining operation is performed highly accurately with ease.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
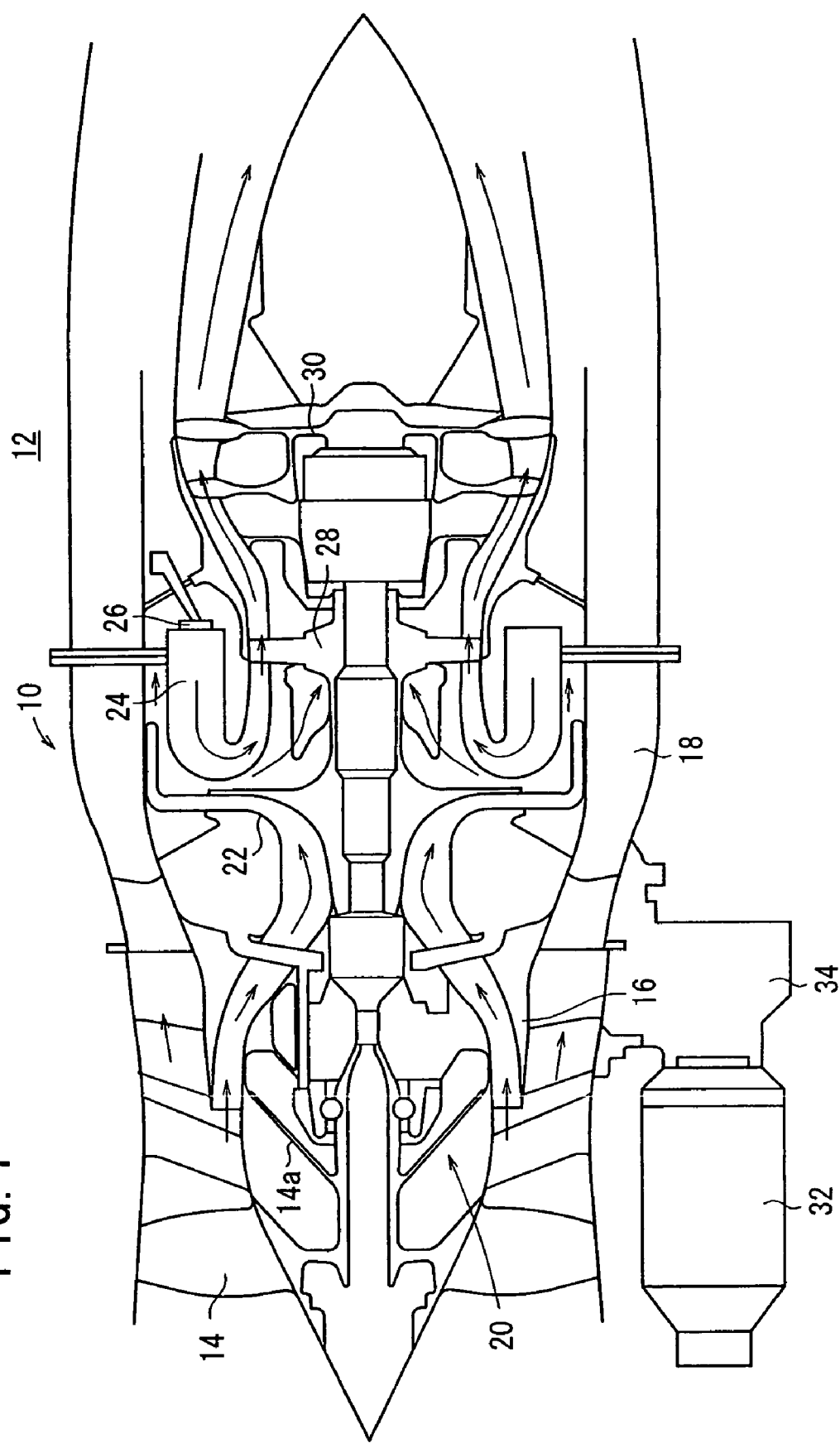
FIG. 1 schematically shows a gas turbine engine of an airplane into which a fan duct is incorporated, wherein a friction stir welding method according to an embodiment of the present invention is carried out.

FIG. 1 schematically shows a gas turbine engine 12 of an airplane into which a fan duct 10 is incorporated, wherein a friction stir welding method according to an embodiment of the present invention is carried out.

The gas turbine engine 12 is provided with a fan 14. The fan 14 is rotated at a high speed to suck the air from the outside. The air is compressed, and it is fed to the backward. A fan bypass passage 18 is formed by a core duct 16 and the fan duct 10 in the vicinity of the fan 14. A thrust force is generated for an unillustrated airframe by the air which is jetted backwardly through the fan bypass passage 18.

The fan 14 constitutes a low pressure compressor 20. The air compressed by the low pressure compressor 20 is fed to a high pressure compressor 22 disposed backward. The air compressed by the high pressure compressor 22 is further fed to a combustion chamber 24 disposed backward. The combustion chamber 24 is provided with a fuel nozzle 26. Fuel is fed from the fuel nozzle 26 to the combustion chamber 24. An air-fuel mixture obtained by mixing the compressed air fed from the high pressure compressor 22 and the fuel injected from the fuel nozzle 26 is ignited and burned in the combustion chamber 24 upon the start-up of the engine.

The combustion of the air-fuel mixture produces high temperature and high pressure gas. The high temperature and high pressure gas is fed to a high pressure turbine 28 to rotate the high pressure turbine 28 at a high speed. The high pressure turbine 28 rotates a rotor 14a of the fan 14, while the high temperature and high pressure gas is fed to a low pressure turbine 30 after the gas drives and rotates the high pressure turbine 28. The low pressure turbine 30 rotates the fan 14 and the rotor 14a of the low pressure compressor 20.

A starter generator 32, into which a starter and a generator are incorporated, is attached to an outer lower surface of the gas turbine engine 12 by an accessory gear box 34.

Figure 2:
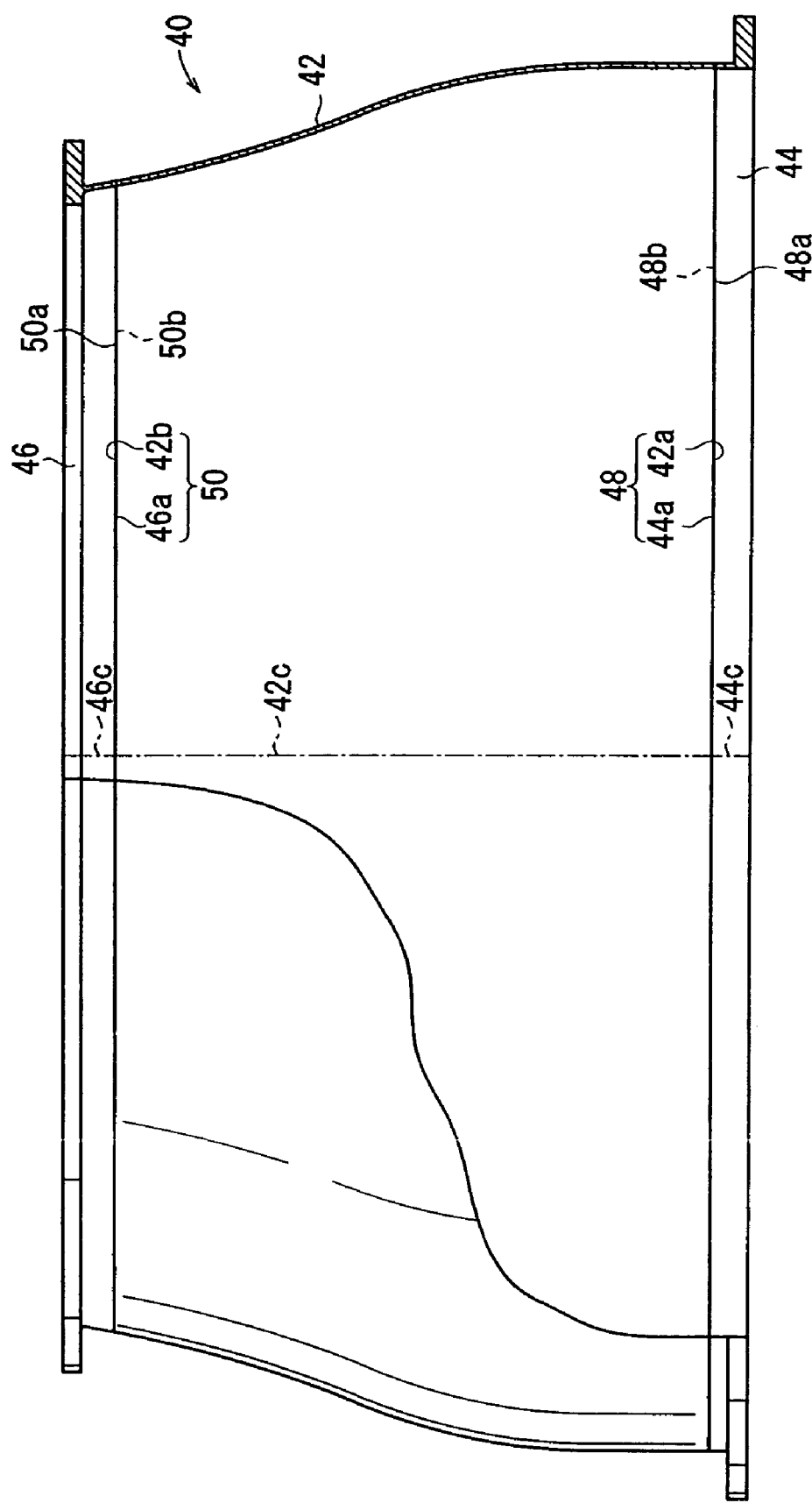
FIG. 2 shows a duct structure of the fan duct.

FIG. 2 shows a duct structure 40 of the fan duct 10. The duct structure 40 comprises a body member (first cylindrical member) 42 which is obtained by forming a thin aluminum plate into a substantially cylindrical shape, and flange members (second cylindrical members) 44, 46 each of which is obtained by forming a thin aluminum plate into a substantially cylindrical shape. An end 42a of the body member 42 abuts an end 44a of the flange member 44 at a first abutment portion 48 while an end 42b of the body member 42 abuts an end 46a of the flange member 46 at a second abutment portion 50. The first and second abutment portions 48, 50 are subjected to the friction stir welding on their outer circumferential surfaces (first surfaces) 48a, 50a to join the body member 42 and the flange members 44, 46.

Figure 3:
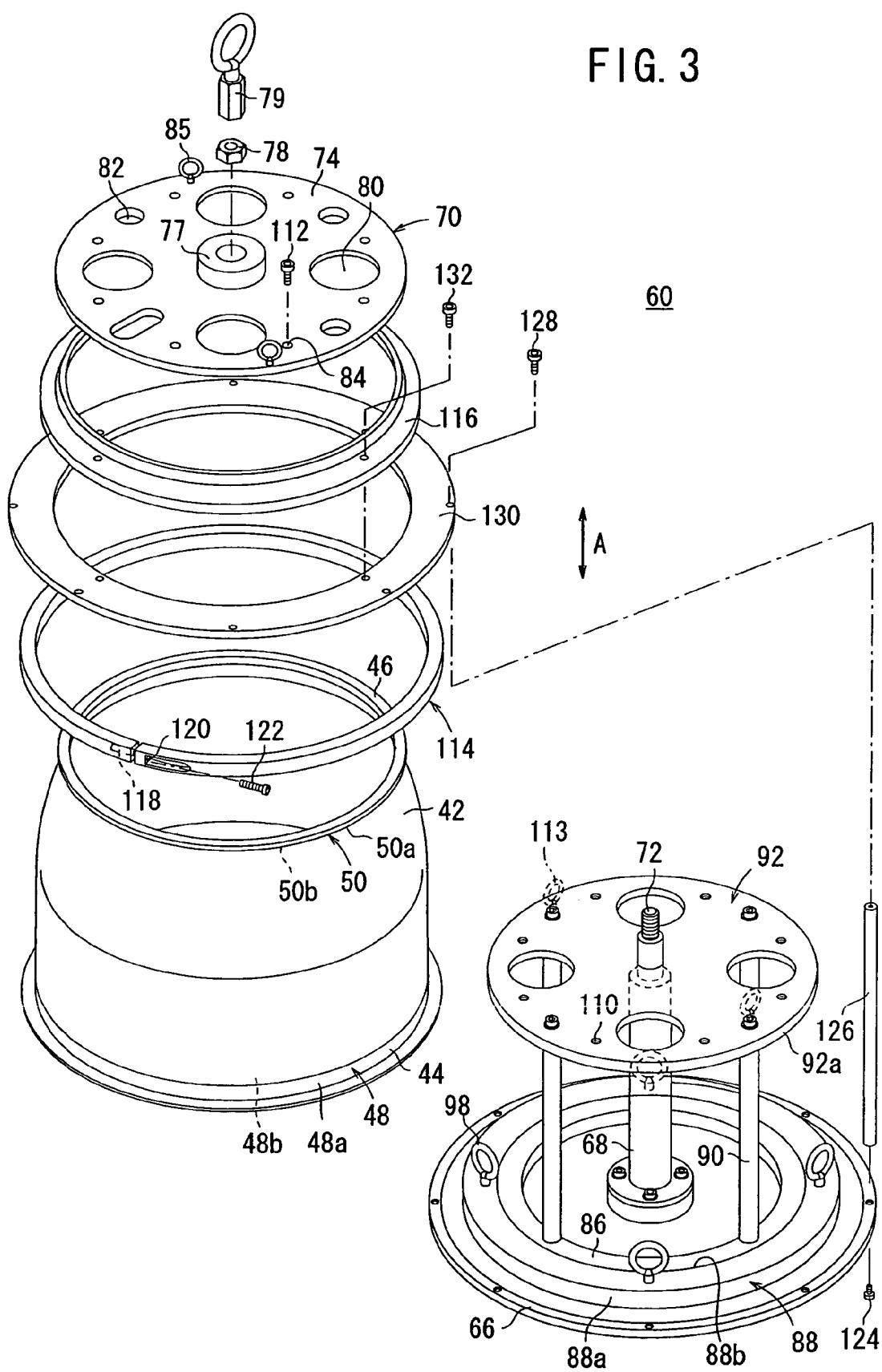
FIG. 3 is a partial exploded perspective view illustrating a friction stir welding apparatus according to an embodiment of the present invention for joining the duct structure.
Figure 4:
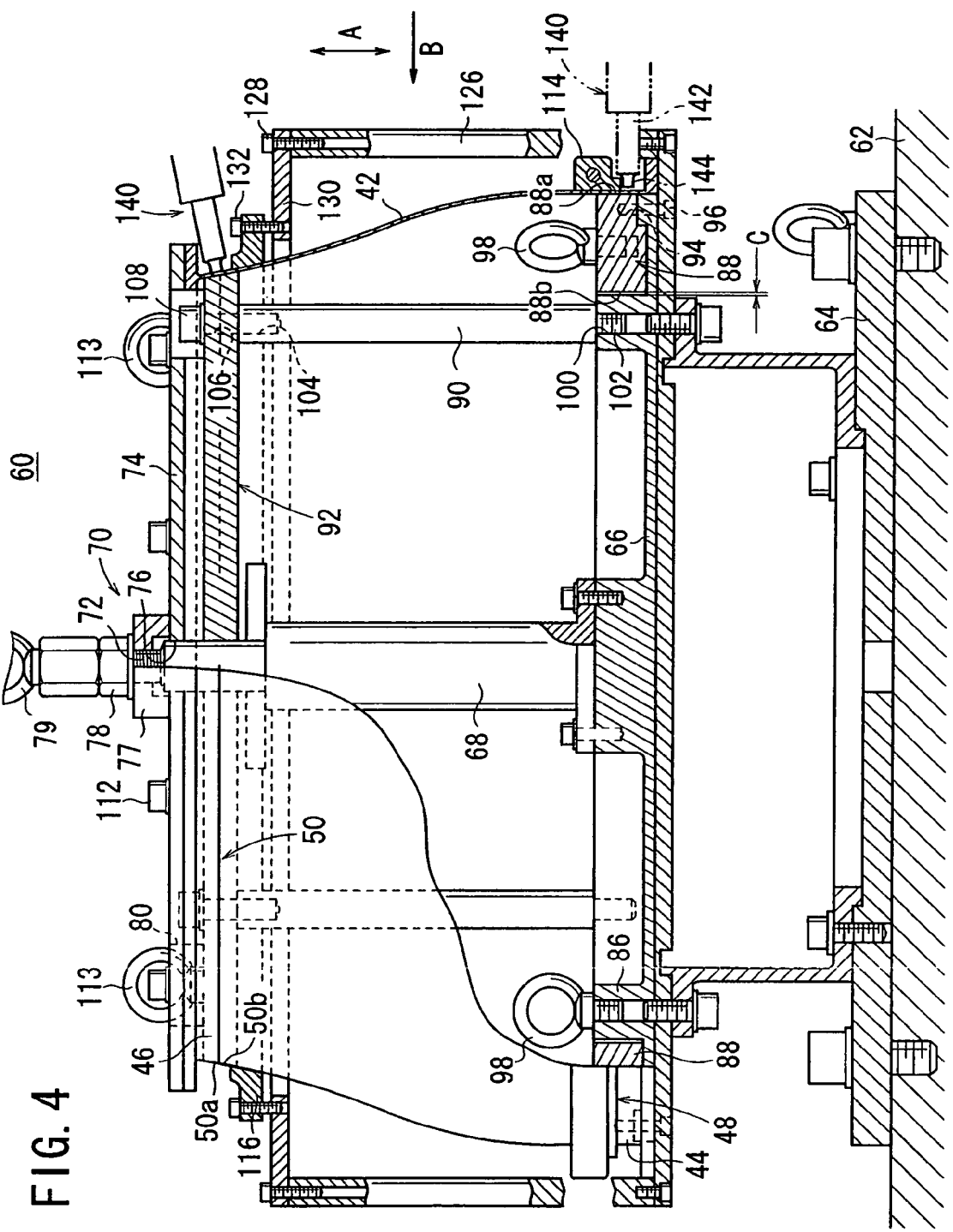
FIG. 4 is a sectional view illustrating the friction stir welding apparatus.
Figure 5:
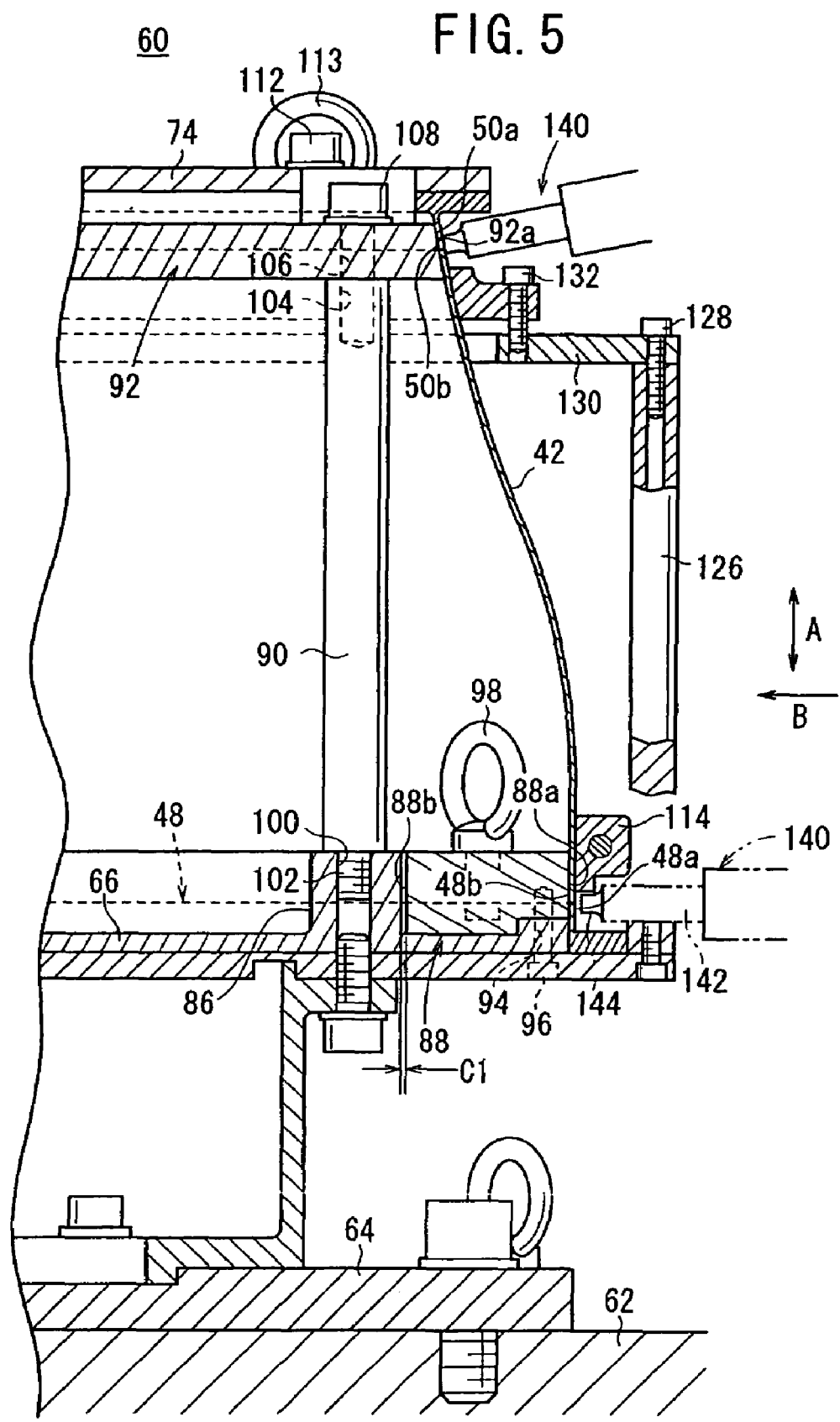
FIG. 5 is a magnified view illustrating a part of the friction stir welding apparatus shown in FIG. 4.

FIG. 3 shows a partial exploded perspective view illustrating a friction stir welding apparatus 60 according to an embodiment of the present invention for performing the friction stir welding for the duct structure 40. FIG. 4 shows a sectional view illustrating the friction stir welding apparatus 60, and FIG. 5 shows a magnified view illustrating a part of the friction stir welding apparatus 60.

The friction stir welding apparatus 60 is provided with a pedestal member 64 which is rotatable while being fixed to a rotary table 62 and which fixes the body member 42 and the flange members 44, 46 previously joined to one another temporarily. A substantially disk-shaped support base 66 is secured over the pedestal member 64. A support pillar 68 is provided at a central portion of the support base 66 and extends in the vertical direction (directions of the arrow A). A screw section 72 is formed at the end of the support pillar 68.

A pressing mechanism 70 includes the screw section 72 and a pressing plate 74. The pressing plate 74 is substantially disk-shaped, and has a hole 76 formed at a central portion for inserting the support pillar 68 thereinto. The pressing plate 74 applies pressing force to the body member 42 and the flange members 44, 46 arranged on the support base 66 in directions of the arrow A substantially perpendicular to a direction of insertion of a probe (direction of the arrow B) as described later on.

A pressing block 77 is engaged with the central portion of the pressing plate 74. A nut member 78 screwed with the screw section 72 presses the pressing plate 74 in the directions of the arrow A by the pressing block 77. A hanging bolt 79 is screwed to the end of the screw section 72. The pressing plate 74 is formed with a plurality of openings 80 which are separated from each other by equal angles, a plurality of openings 82 which have diameters smaller than those of the openings 80, and a plurality of bolt-inserting holes 84. Hanging bolts 85 are screwed to the pressing plate 74.

A ring section 86 is formed for the support base 66 so that the ring section 86 is expanded in the directions of the arrow A around the support pillar 68. A first backing jig 88 is detachably provided on the outer circumference of the ring section 86 with a predetermined interstice C1. A second backing jig 92 is attached by rods 90 which are fixed to the ring section 86.

The first backing jig 88 is formed of, for example, an iron-based material, and it is substantially ring-shaped. An outer circumferential surface 88a of the first backing jig 88 is completely circular, which is arranged to be capable of supporting the inner circumferential surface (second surface) 48b of the first abutment portion 48 between the body member 42 and the flange member 44 (see FIG. 5). The predetermined interstice C1 is formed between an inner circumferential surface 88b of the first backing jig 88 and the outer circumferential surface of the ring section 86.

Screw holes 94 separated from each other by predetermined angular intervals are formed in the back surface (surface opposed to the support base 66) of the first backing jig 88. Bolts 96 are screwed into the respective screw holes 94 from the back surface of the support base 66, and thus the first backing jig 88 is fixed onto the support base 66. A plurality of hanging bolts 98 are installed to the upper surface of the first backing jig 88.

Screw holes 100 separated from each other by predetermined angular intervals are formed on the upper surface of the ring section 86. Screw sections 102 have first ends provided with the respective rods 90 are screwed with the screw holes 100. Screw holes 104 are formed at second ends of the rods 90. Bolts 108 are inserted into holes 106 which are formed through the second backing jig 92. When the bolts 108 are screwed into the screw holes 104, the second backing jig 92 is fixed to the rods 90.

The second backing jig 92 is formed of, for example, an iron-based material, and is substantially disk-shaped. An outer circumferential surface 92a of the second backing jig 92 is completely circular, which is in close contact with an inner circumferential surface (second surface) 50b of the second abutment portion 50 between the body member 42 and the flange member 44 (see FIG. 5). Taking the spring back of the duct structure 40 into consideration, it is necessary that the duct structure 40 is maintained to a designed size with the outer circumferential surfaces 88a, 92a of the first and second backing jigs 88, 92. The outer diameters of the outer circumferential surfaces 88a, 92a are larger than the inner diameters of the first and second abutment portions 48, 50 before being heated.

Screw holes 110, which correspond to the holes 84 of the pressing plate 74, are formed for the second backing jig 92. Bolts 112 to be inserted into the holes 84 are screwed into the screw holes 110, and thus the pressing plate 74 is fixed to the second backing jig 92. Hanging bolts 113 are screwed to the second backing jig 92.

A first clamp jig 114, which fixes the first abutment portion 48, is arranged on the outer circumferential surface 48a of the first abutment portion 48. A second clamp jig 116, which fixes the second abutment portion 50, is arranged on the outer circumferential surface 50a of the second abutment portion 50.

As shown in FIG. 3, the first clamp jig 114 is a belt obtained by forming a square member to have a ring-shaped configuration. A screw hole 118 is formed at one end surface of the first clamp jig 114, and a hole 120 is formed at the other end surface. When a bolt 122 is screwed into the screw hole 118 through the hole 120, the size of the first clamp jig 114 in the radial direction is reduced to tighten the outer circumferential surface 48a of the first abutment portion 48.

As shown in FIGS. 3 to 5, a plurality of rods 126 are fixed to outer circumferential edge portions of the support base 66 by bolts 124. The respective rods 126 extend in the directions of the arrow A. An attachment plate 130 is provided by bolts 128 which are screwed into ends of the respective rods 126. The attachment plate 130 is substantially ring-shaped. The second clamp jig 116 is fixed to the attachment plate 130 by bolts 132. The second clamp jig 116 is substantially ring-shaped, which tightens the outer circumferential surface 50a of the second abutment portion 50.

As shown in FIG. 5, a welding machine 140 for joining the first abutment portion 48 is provided with a rotary tool 142. A probe 144, which protrudes by a predetermined length from the end surface, is provided at the tip of the rotary tool 142. The probe 144 is inserted into the first abutment portion 48 by a depth which is smaller than the thickness of the first abutment portion 48. The second abutment portion 50 may be joined by using the welding machine 140 described above, or alternatively, by using another welding machine.

Figure 6:
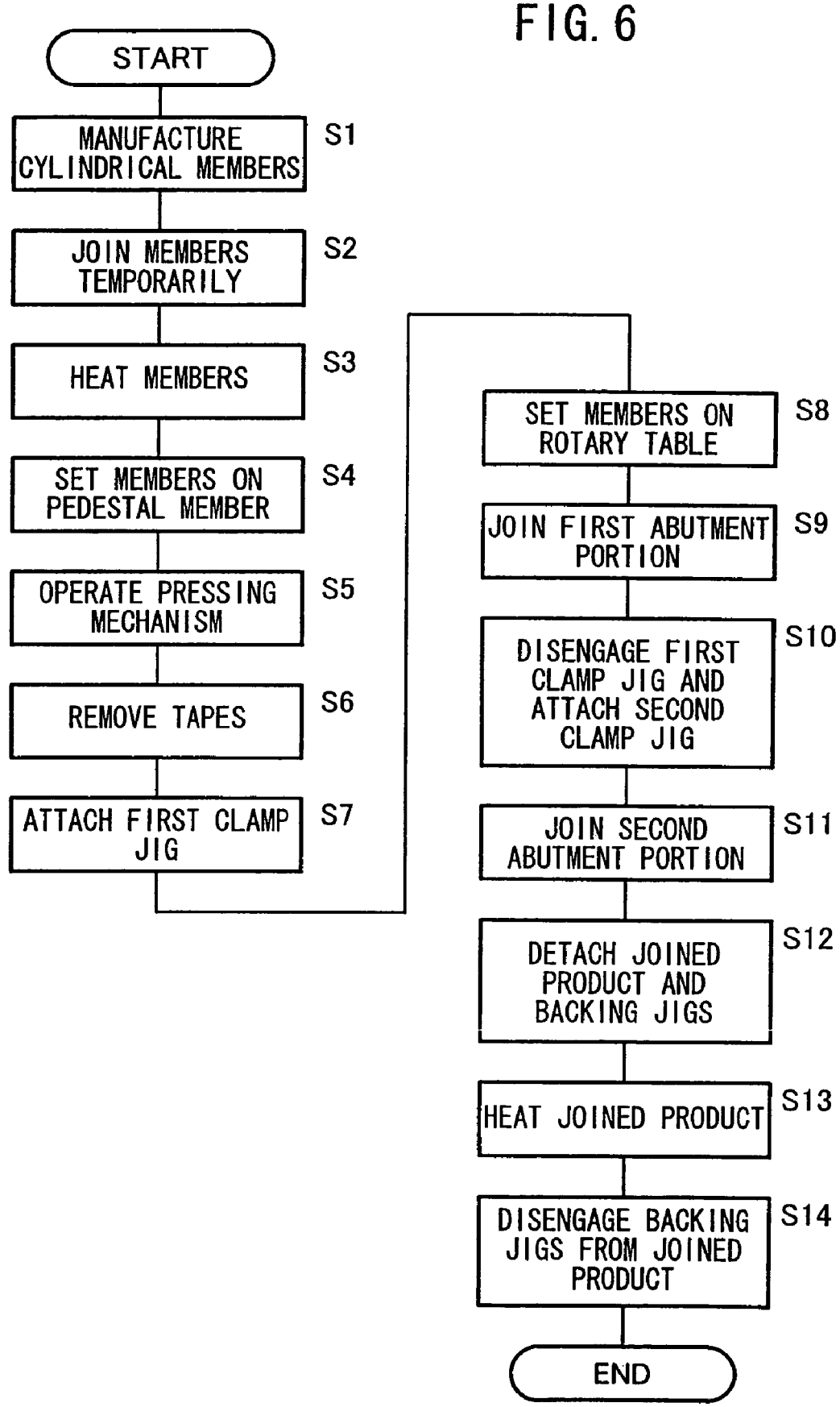
FIG. 6 is a flow chart of the friction stir welding method.

An explanation will be made below with reference to a flow chart shown in FIG. 6 about the operation of the friction stir welding apparatus 60 and the friction stir welding method according to the embodiment of the present invention.

First, the body member 42 and the flange members 44, 46, each of which has the cylindrical shape, are manufactured (Step S1). Specifically, as shown in FIG. 2, a thin aluminum plate is formed to have the substantially cylindrical shape. The friction stir welding (FSW) is performed along an abutment portion 42c at which both ends of the thin aluminum plate are butted together, and thus the abutment portion 42c is joined. As a result, the body member 42 is obtained.

Similarly, thin aluminum plates are formed to have the substantially cylindrical shapes, and then respective abutment portions 44c, 46c is joined by the friction stir welding. Thus, the flange members 44, 46 are obtained.

During the friction stir welding described above, an unillustrated probe is arranged while being offset by a predetermined distance from the center of the cylindrical shape so that the joined surface is effectively prevented from being cut.

Subsequently, aluminum tapes (not shown) are applied to predetermined positions of the first and second abutment portions 48, 50 where the ends 44a, 46a of the flange members 44, 46 are butted against the ends 42a, 42b of the body member 42. Accordingly, the flange members 44, 46 are temporarily joined on both sides of the body member 42 (Step S2). The body member 42 and the flange members 44, 46, which have been temporarily joined to one another, are arranged in an unillustrated heating furnace, and heated to a predetermined temperature (Step S3). The body member 42 and the flange members 44, 46 heated to the predetermined temperature are placed on the pedestal member 64 (Step S4).

Specifically, as shown in FIGS. 3 to 5, the first backing jig 88 is arranged around the ring section 86 on the support base 66 of the pedestal member 64. The bolts 96 are screwed from the back surface of the support base 66 into the screw holes 94 of the first backing jig 88. Accordingly, the first backing jig 88 is fixed on the support base 66 (see FIGS. 4 and 5).

On the other hand, the screw sections 102 of the rods 90 are screwed into the screw holes 100 formed in the ring section 86. The bolts 108 are screwed into the screw holes 104 of the rods 90 through the holes 106 of the second backing jig 92 while the second backing jig 92 is arranged on the rods 90. Thus, the second backing jig 92 is fixed onto the respective rods 90. In this state, the body member 42 and the flange members 44, 46 heated to the predetermined temperature are externally fitted on or attached to the first and second backing jigs 88, 92.

In this situation, according to the embodiment of the present invention, the body member 42 and the flange members 44, 46 are heated to the predetermined temperature, and their inner circumferential diameters are expanded by thermal expansion. Therefore, the first and second abutment portions 48, 50 of the body member 42 and the flange members 44, 46 are externally fitted on the first and second backing jigs 88, 92 with ease. When the body member 42 and the flange members 44, 46 are cooled, the inner circumferential diameters are shrunk or contracted. The inner circumferential surfaces 48b, 50b of the first and second abutment portions 48, 50 are correctly fitted on and in close contact with the outer circumferential surfaces 88a, 92a of the first and second backing jigs 88, 92 (see FIG. 5). That is because the outer diameters of the outer circumferential surfaces 88a, 92a of the first and second backing jigs 88, 92 are larger than the inner diameters of the inner circumferential surfaces 48b, 50b of the first and second abutment portions 48, 50 before being heated.

In this arrangement, the outer circumferential surfaces 88a, 92a of the first and second backing jigs 88, 92 are completely circular. The ends 42a, 44a and the ends 42b, 46a are maintained to have the identical circumferential lengths, respectively, and are maintained to be completely circular.

Subsequently, the pressing plate 74 is arranged on the second backing jig 92. The pressing block 77 is externally installed to the screw section 72, and then the nut member 78 is screwed into the screw section 72. Accordingly, the pressing plate 74 is pressed by the pressing block 77, and the tightening load is applied in the directions of the arrow A to the body member 42 and the flange members 44, 46. As a result, the first and second abutment portions 48, 50 are pressed and retained so that no gap is formed (Step S5). When the process proceeds to Step S6, then the aluminum tapes (not shown) applied to the first and second abutment portions 48, 50 are removed, and the surfaces are washed.

In Step S7, the first clamp jig 114 is attached. The first clamp jig 114 is belt-shaped, and it circumscribes the outer circumference of the body member 42 along the side of the end 42a. Accordingly, when the bolt 122 is inserted into the hole 120, and the bolt 122 is screwed into the screw hole 118, then the inner circumferential diameter of the first clamp jig 114 is reduced. Therefore, the first clamp jig 114 tightens the outer circumferential surface of the body member 42.

Figure 7:
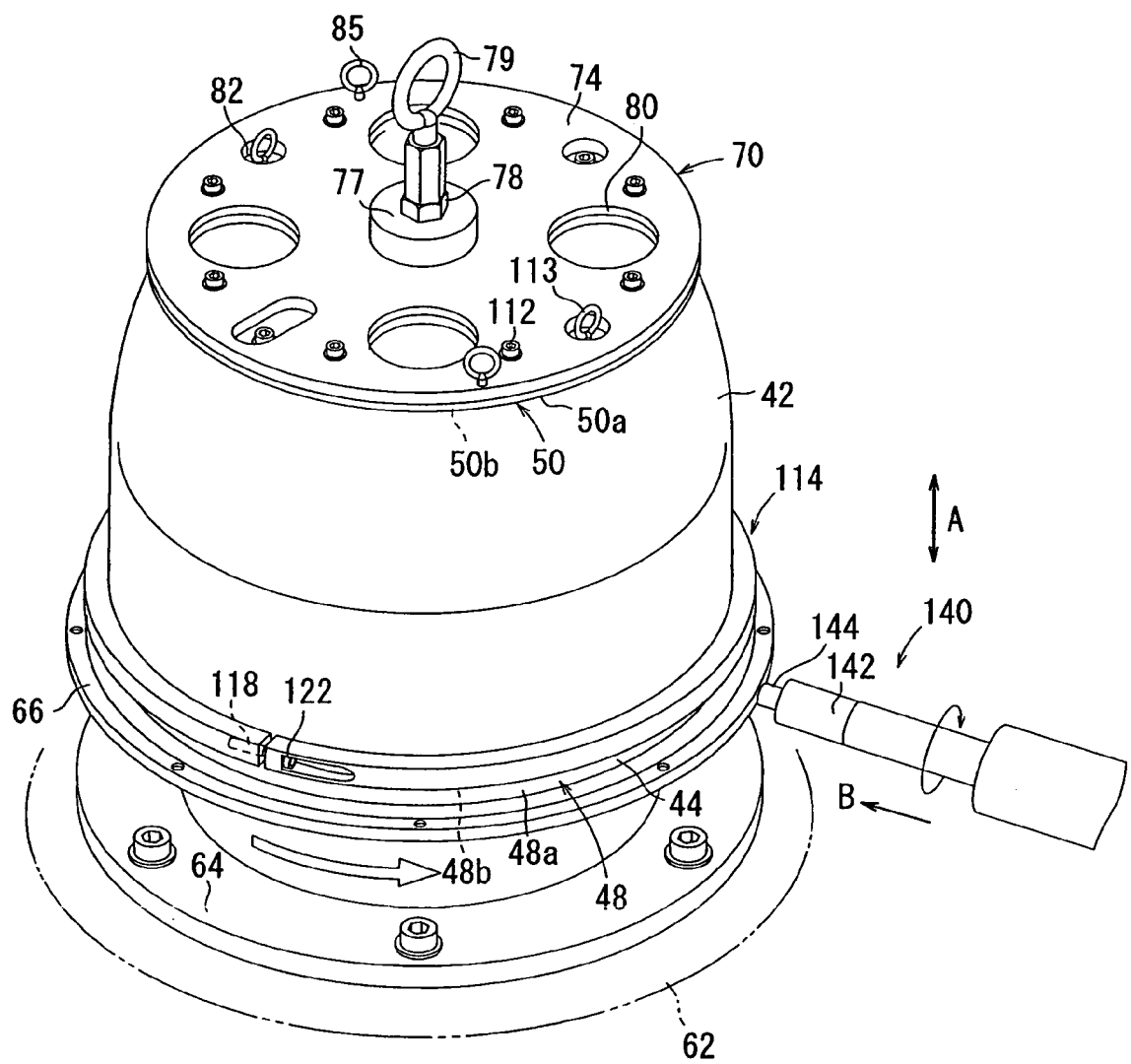
FIG. 7 shows the operation to be performed when a first abutment portion is joined.

Subsequently, the pedestal member 64 is fixed by screws to the rotary table 62 (Step S8). In this state, as shown in FIG. 7, the rotary tool 142 of the welding machine 140 is moved toward the first abutment portion 48 while rotating at a high speed. Accordingly, the probe 144 rotated at the high speed is inserted into the first abutment portion 48. The first abutment portion 48 is welded with frictional heat. During this process, the rotary table 62 is rotated. The probe 144 rotated at the high speed is moved relatively along the first abutment portion 48 to join the entire circumference of the first abutment portion 48 (Step S9).

When the joining operation is completed for the first abutment portion 48, the rotary table 62 is stopped, and the welding machine 140 is separated from the first abutment portion 48. Further, the first clamp jig 114 is detached, while the second clamp jig 116 is attached (Step S10). The first clamp jig 114 is removed from the body member 42 by increasing the inner circumferential diameter by separating the bolt 122 from the screw hole 118.

On the other hand, the plurality of rods 126 are attached to the outer circumferential edge portions of the support base 66 by the bolts 124. The attachment plate 130 is attached to the ends of the rods 126 by the bolts 128. The second clamp jig 116 is installed to the attachment plate 130 by the bolts 132. The second clamp jig 116 tightens the outer circumferential surface on the side of the end 42b of the body member 42.

Figure 8:
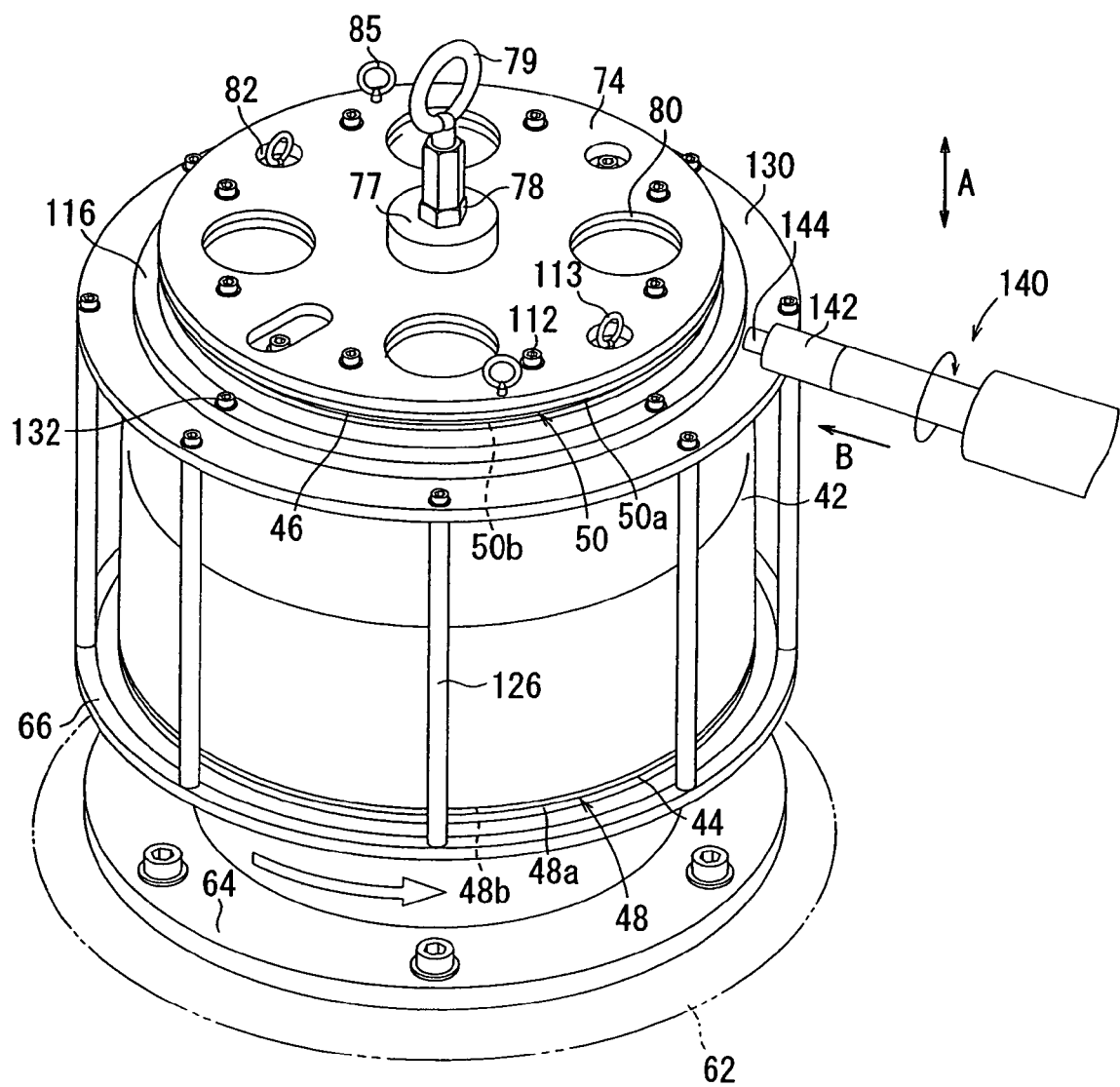
FIG. 8 shows the operation to be performed when a second abutment portion is joined.
Figure 9:
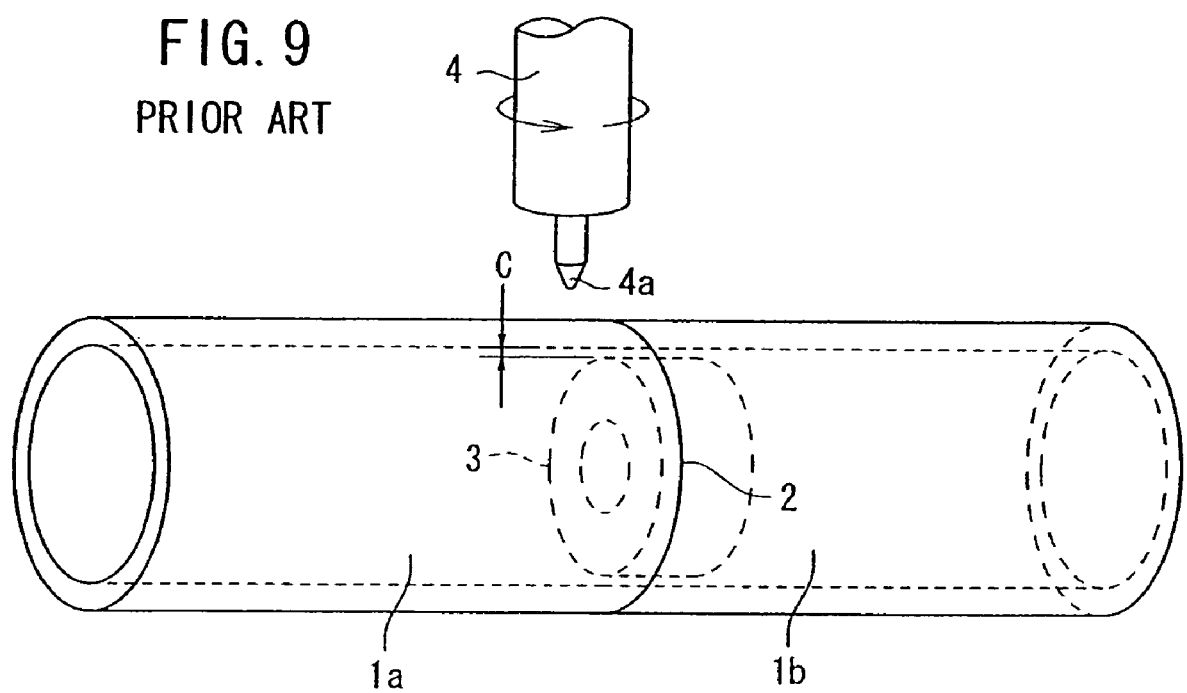
FIG. 9 shows a conventional method of joining aluminum members.

In this state, as shown in FIG. 8, for example, the welding machine 140 faces the second abutment portion 50. While the probe 144 is rotated together with the rotary tool 142, the probe 144 is inserted into the outer circumferential surface 50a of the second abutment portion 50. The second abutment portion 50 is rotated with respect to the welding machine 140 together with the rotation of the rotary table 62. The entire circumference of the second abutment portion 50 is subjected to the friction stir welding (Step S11).

The first and second abutment portions 48, 50 are joined one another as described above, and the duct structure 40 is obtained as a joined product. After that, the duct structure 40 is detached from the pedestal member 64 together with the first and second backing jigs 88, 92 (Step S12). Specifically, the bolts 112 are disengaged from the screw holes 110 of the second backing jig 92, and the second backing jig 92 is released from the pressing plate 74. Further, when the bolts 108 are disengaged from the screw holes 104 of the rods 90, the second backing jig 92 can be separated from the rods 90. On the other hand, when the bolts 96 are disengaged from the screw holes 94 of the first backing jig 88, the first backing jig 88 can be separated from the support base 66.

Accordingly, the hanging bolt 79 and the nut member 78 are separated from the screw section 72, and the pressing block 77 is detached. Further, the pressing plate 74 is detached from the support pillar 68. The duct structure 40 is removed from the support base 66 while the first and second backing jigs 88, 92 are fixed on the inner circumferential surface. The duct structure 40 is arranged in the unillustrated heating furnace to perform a heating treatment (Step S13).

In this embodiment, the duct structure 40 is made of the aluminum plate, while each of the first and second backing jigs 88, 92 is made of the iron-based material. Thus, thermal expansion is different from each other. Therefore, the duct structure 40 is firstly thermally expanded in the heating furnace. Accordingly, the first and second backing jigs 88, 92 can be removed easily from the inner circumferential surface of the duct structure 40 (Step S14).

The hanging bolts 98, 113 are provided for the first and second backing jigs 88, 92. The hanging bolts 98, 113 are hung with an unillustrated crane or the like. Accordingly, the first and second backing jigs 88, 92 can be attached/detached with ease with respect to the pedestal member 64.

As described above, in the embodiment of the present invention, the outer circumferential surfaces 48a, 50a of the first and second abutment portions 48, 50 are welded by the friction stir welding while the inner circumferential surfaces 48b, 50b of the first and second abutment portions 48, 50 are in close contact with the outer circumferential surfaces 88a, 92a of the first and second backing jigs 88, 92 (see FIG. 7). Accordingly, when the probe 144 rotated at high speed is moved relatively along each of the outer circumferential surfaces 48a, 50a while the probe 144 is inserted into each of the outer circumferential surfaces 48a, 50a of the first and second abutment portions 48, 50, the first and second abutment portions 48, 50 are not deformed.

In particular, the outer circumferential surfaces 88a, 92a of the first and second backing jigs 88, 92 are completely circular. The inner circumferential surfaces 48b, 50b of the first and second abutment portions 48, 50 become completely circular since the inner circumferential surfaces 48b, 50b are in close contact with the outer circumferential surfaces 88a, 92a. Further, the respective ends 42a, 44a have the identical inner circumferential length, and the ends 42b, 46a have the identical circumferential length.

Therefore, even when the first and second abutment portions 48, 50 are thin and relatively large in diameter, phase difference is not generated, which would be otherwise caused, for example, by deformation or wrinkles. It is possible to maintain the satisfactory circularity for the first and second abutment portions 48, 50, and the dimensional accuracy is improved. Accordingly, the friction stir welding operation is efficiently performed for the first and second abutment portions 48, 50 by simple and economical steps.

The first and second abutment portions 48, 50 are fitted on and in close contact with the outer circumferential surfaces 88a, 92a of the first and second backing jigs 88, 92. Accordingly, it is possible to position the first and second abutment portions 48, 50 without deviation, and the friction stir welding process is efficiently carried out. In this procedure, the first and second abutment portions 48, 50 are fitted on the first and second backing jigs 88, 92 while the inner circumferential diameters are increased by thermal expansion by being heated to the predetermined temperature. Therefore, it is possible to make the first and second abutment portions 48, 50 closely contact the outer circumferential surfaces 88a, 92a of the first and second backing jigs 88, 92 easily and correctly.

On the other hand, when the duct structure 40 is heated to increase the inner circumferential diameter after completing the joining process for the first and second abutment portions 48, 50, the operation for separating the first and second backing jigs 88, 92 is performed with ease. Accordingly, it is easy to efficiently perform the entire process of the friction stir welding.

The pressing force is applied to the body member 42 and the flange members 44, 46 in the direction (directions of the arrow A) substantially perpendicular to the direction of insertion (direction of the arrow B) of the probe 144 by the pressing mechanism 70. Accordingly, the joining of the first and second abutment portions 48, 50 can be correctly achieved by the pressure without a gap in the first and second abutment portions 48, 50. The highly accurate joining process is carried out. Further, the structure of the pressing mechanism 70 is simplified.

When the joining process is performed for the first abutment portion 48, the first clamp jig 114 is installed to the outer circumferential surface 48a of the first abutment portion 48. Therefore, even when the first abutment portion 48 is expanded during the friction stir welding, the position of the first abutment portion 48 is not deviated, and highly accurate joining operation is carried out. On the other hand, when the second abutment portion 50 is joined, the outer circumferential surface 50a of the second abutment portion 50 is retained by the second clamp jig 116, in which the same effect is obtained.

In the embodiment of the present invention, the flange members 44, 46 and the body member 42 temporarily joined with the unillustrated aluminum tapes are installed to the first and second backing jigs 88, 92 by increasing the inner circumferential diameters by effecting the heating to the predetermined temperature in the heating furnace. However, the invention is not limited thereto. Alternatively, for example, the first and second backing jigs 88, 92 may be cooled to decrease the outer diameters of the first and second backing jigs 88, 92.

In the present invention, the ends of the first and second cylindrical members are butted together at the abutment portion, and the abutment portion has the second surface which is in close contact with the outer circumferential surface of the backing jig. The rotating probe is pressed against the first surface of the abutment portion to apply the joining treatment thereby. Accordingly, even when the abutment portion is especially thin and large in diameter, it is possible to reliably retain the abutment portion to have the desired shape. Therefore, the friction stir welding operation is performed efficiently and highly accurately for the abutment portion by simple and economical arrangement and steps.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A friction stir welding apparatus for joining an abutment portion by moving a rotating probe relatively along said abutment portion while pressing said probe against one surface of said abutment portion at which an end of a first cylindrical member and an end of a second cylindrical member are butted together, said friction stir welding apparatus comprising:

a pedestal member on which said first and second cylindrical members are fixed;

a backing jig on which said first and second cylindrical members are externally fitted so that the entire circumference of another surface of said abutment portion has a predetermined circumferential length, said backing jig having a different thermal expansion from those of said first and second cylindrical members, and being separated from said abutment portion after friction stir welding; and a pressing mechanism which applies a pressing force to said abutment portion, wherein said pressing mechanism includes a pressing plate that applies said pressing force to said first and second cylindrical members toward said pedestal member in a direction along a longitudinal axis of said first and second cylinder members that is substantially perpendicular to a direction of insertion of said probe so as to abut said first and second cylindrical members against each other, wherein an outer diameter of an outer circumferential surface of said backing jig is larger than a diameter of said another surface of said abutment portion, and wherein said first and second cylindrical members are externally fitted on said backing jig by relatively thermally expanding said first and second cylindrical members as compared with said backing jig.

2. The friction stir welding apparatus according to claim 1, wherein an outer circumferential surface of said backing jig has a completely circular shape, and circumferences of said ends of said first and second cylindrical members, which are in close contact with said outer circumferential surface, have an identical length.

3. The friction stir welding apparatus according to claim 1, further comprising a clamp jig which is arranged on said one surface of said abutment portion and which prevents said abutment portion from deformation during said friction stir welding.

4. A friction stir welding apparatus for joining an abutment portion by moving a rotating probe relatively along said abutment portion while pressing said probe against one surface of said abutment portion at which an end of a first cylindrical member and an end of a second cylindrical member are butted together, said friction stir welding apparatus comprising:

> a pedestal member on which said first and second cylindrical members are fixed, wherein said pedestal member rotates about a rotational axis;
> a backing jig on which said first and second cylindrical members are externally fitted so that the entire circumference of another surface of said abutment portion has a predetermined circumferential length, said backing jig having a different thermal expansion from those of said first and second cylindrical members, and being separated from said abutment portion after friction stir welding; and
> a pressing mechanism which applies a pressing force to said abutment portion, wherein the pressing mechanism includes a pressing plate that applies said pressing force toward said pedestal member in a direction parallel to the rotational axis of the pedestal member so as to abut said first and second cylindrical members against each other,
> wherein an outer diameter of an outer circumferential surface of said backing jig is larger than a diameter of said another surface of said abutment portion, and
> wherein said first and second cylindrical members are externally fitted on said backing jig by relatively thermally expanding said first and second cylindrical members as compared with said backing jig.

* * * * *